(12) United States Patent
Kemler et al.

(10) Patent No.: US 8,979,707 B2
(45) Date of Patent: Mar. 17, 2015

(54) METHOD FOR OPERATING A DRIVE TRAIN

(75) Inventors: Johannes Kemler, Ravensburg (DE);
Joachim Staudinger, Ravensburg (DE);
Maik Wurthner, Markdorf (DE); Ingo Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 584 days.

(21) Appl. No.: 13/497,919

(22) PCT Filed: Sep. 7, 2010

(86) PCT No.: PCT/EP2010/063079
§ 371 (c)(1),
(2), (4) Date: Mar. 23, 2012

(87) PCT Pub. No.: WO2011/039032
PCT Pub. Date: Apr. 7, 2011

(65) Prior Publication Data
US 2012/0178586 A1     Jul. 12, 2012

(30) Foreign Application Priority Data
Oct. 1, 2009   (DE) .......................... 10 2009 045 256

(51) Int. Cl.
*B60W 10/04* (2006.01)
*F16H 61/12* (2010.01)
*F16H 61/70* (2006.01)

(52) U.S. Cl.
CPC .............. *F16H 61/12* (2013.01); *F16H 61/702* (2013.01); *F16H 2061/1228* (2013.01); *F16H 2306/48* (2013.01); *F16H 2306/50* (2013.01)
USPC ........... 477/115; 477/112; 475/207; 475/209; 701/51

(58) Field of Classification Search
USPC .............. 475/207, 209; 477/112, 115; 701/51
See application file for complete search history.

(56) References Cited

U.S. PATENT DOCUMENTS

| | | | |
|---|---|---|---|
| 6,044,721 A | 4/2000 | Genise | |
| 7,662,063 B2 | 2/2010 | Schnitzer | |
| 7,691,029 B2 * | 4/2010 | Guggolz et al. | 477/115 |
| 7,976,431 B2 | 7/2011 | Bader et al. | |
| 8,066,617 B2 * | 11/2011 | Steinborn et al. | 477/15 |
| 2010/0285922 A1 | 11/2010 | Breuer et al. | |

FOREIGN PATENT DOCUMENTS

| | | |
|---|---|---|
| DE | 699 21 261 T2 | 10/2005 |
| DE | 10 2004 055 857 A1 | 6/2006 |
| DE | 10 2005 049 198 A1 | 4/2007 |
| DE | 10 2007 010 829 A1 | 9/2008 |
| DE | 10 2007 043 695 A1 | 3/2009 |
| DE | 10 2007 055 720 A1 | 6/2009 |
| EP | 0 651 180 A1 | 5/1995 |
| WO | 2008/107318 A1 | 9/2008 |

* cited by examiner

*Primary Examiner* — Derek D Knight
(74) *Attorney, Agent, or Firm* — Davis & Bujold, PLLC; Michael J. Bujold

(57) ABSTRACT

A method of operating a drive-train which comprises an automated shift transmission having an unsynchronized main transmission and a synchronized downstream group that is drivingly coupled downstream from the main transmission. An input shaft of the automated transmission is connected, via a clutch, to a drive aggregate and an output shaft of the automated transmission is connected to a drive axle. When the vehicle is driven and the main transmission is in a neutral position, if the drive aggregate malfunctions, to engage a gear, the downstream group is adjusted to stop transmitting power and thereby coast to a stop. A shifting impulse is applied to a shifting cylinder of the main transmission so that shifting elements, of the main transmission, ratchet over one another and eventually mesh thus engaging the main transmission, and once the main transmission is engaged, the downstream group is brought to a power-flow-transmitting position.

15 Claims, 1 Drawing Sheet

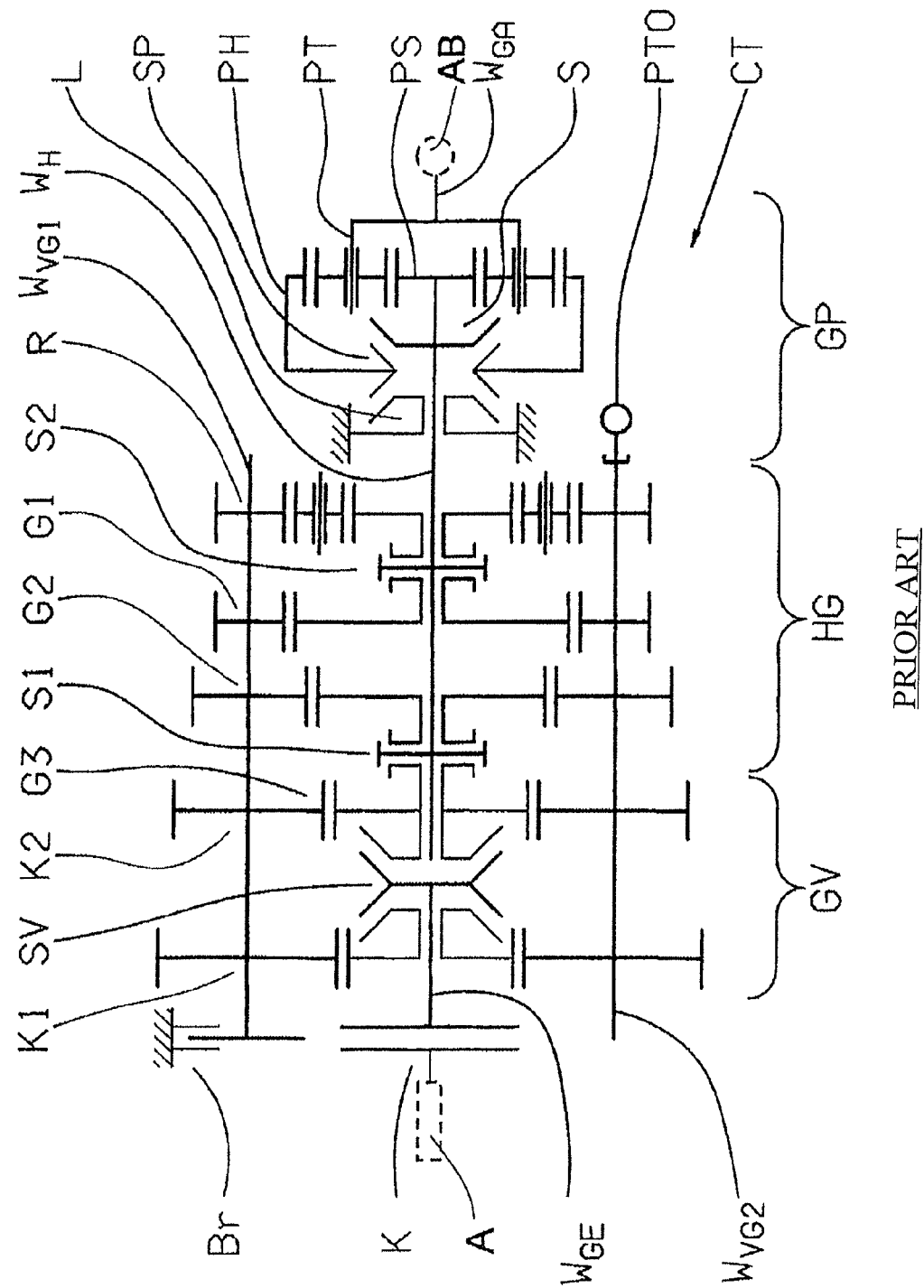

METHOD FOR OPERATING A DRIVE TRAIN

This application is a National Stage completion of PCT/EP2010/063079 filed Sep. 7, 2010, which claims priority from German patent application serial no. 10 2009 045 256.7 filed Oct. 1, 2009.

FIELD OF THE INVENTION

The invention concerns a method for operating a drivetrain comprising at least a drive aggregate and an automated shift transmission.

BACKGROUND OF THE INVENTION

Automated shift transmissions designed as group transmissions with a multi-gear main transmission and a downstream group, in particular one designed as a range group drivingly coupled downstream from the main transmission, and sometimes with an upstream group, in particular one designed as a splitter group drivingly coupled upstream from the main transmission, have been known for a long time and are preferably used in utility vehicles. By means of a splitter group of two-stage design with a gear ratio interval that corresponds approximately to half of an average gear ratio interval between two successive gears of the main transmission, the gear intervals of the main transmission are halved and the total number of gears available in the group transmission is doubled. For example, by means of a two-stage range group with a gear interval above the overall gear interval of the main transmission by approximately an average gear interval between two successive gears of the main transmission, the ratio spread of the group transmission is approximately doubled and the total number of gears available is again doubled.

The splitter group can be connected upstream or downstream from the main transmission and can therefore be made as an upstream or a downstream group. Likewise, the range group can be connected upstream or downstream from the main transmission and can therefore be an upstream or a downstream group. Automated shift transmissions, which comprise interlocking shifting elements, are to be distinguished from automatic power shift transmissions with frictional shifting elements.

The sole FIGURE shows a layout of a group transmission CT of the so-termed AS-Tronic family produced by the present applicant together with a drive aggregate A and an axle drive AB. The group transmission CT shown in the FIGURE comprises a main transmission HG, an upstream group in the form of a splitter group GV drivingly coupled upstream from the main transmission HG and a downstream group in the form of a range group GP drivingly coupled downstream from the main transmission HG. The main transmission HG of the group transmission CT in the FIGURE is in the form of a direct-gear transmission of countershaft design and comprises a main shaft $W_H$ and two countershafts $W_{VG1}$ and $W_{VG2}$, the first countershaft $W_{VG1}$ being provided with a controllable transmission brake Br.

The main transmission HG is formed as a three-stage transmission with three gears G1, G2 and G3 for forward driving and with one gear R for driving in reverse. Loose wheels of the gears G1, G2 and R are respectively mounted to rotate on the main shaft $W_H$ and can be engaged by associated claw clutches. The associated fixed wheels are arranged in a rotationally fixed manner on the countershafts $W_{VG1}$ and $W_{VG2}$. The highest gear G3, made as a direct gear, can be engaged by means of a direct shifting clutch. The shifting clutches of the gears G3 and G2 and the shifting clutches of the gears G1 and R are in each case in the form of claw clutches and are respectively combined in common shifting packets S1 and S2.

The upstream group of the group transmission CT in the FIGURE, formed as a splitter group GV, is a two-stage group and is also of countershaft design such that the two gear steps K1 and K2 of the upstream group GV form two shiftable input constants of the main transmission HG. By virtue of a small gear ratio difference between the two gear steps K1 and K2, the upstream group GV constitutes a splitter group.

The loose wheel of the first gear step K1 is mounted to rotate on the input shaft $W_{GE}$, which is connected by way of a controllable separator clutch K to the drive aggregate A indicated by broken lines, which is in the form of an internal combustion engine and is not part of the group transmission.

The loose wheel of the second gear step K2 is mounted to rotate on the main shaft $W_H$. The fixed wheels of the two gears K1 and K2 of the upstream group GV are respectively arranged in a rotationally fixed manner on the countershafts $W_{VG1}$ and $W_{VG2}$ of the main transmission HG, in each case extended on the input side. The synchronized shifting clutches of the upstream group GV, formed as claw clutches, are combined in a common shifting packet SV.

The downstream group of the group transmission CT in the FIGURE, arranged after the main transmission HG and formed as a range group GP, is also of two-stage design but is of planetary configuration with a simple planetary gearset. The sun gear PS is connected in a rotationally fixed manner to the main shaft $W_H$ of the main transmission HG extended on the output side. The planetary carrier PT is coupled in a rotationally fixed manner to the output shaft $W_{GA}$ of the group transmission CT, which is connected to an axle drive AB indicated by a broken line. The ring gear PH is connected to a shifting packet SP with two synchronized shifting clutches in the form of claw clutches by means of which the range group GP can be shifted alternatively, by connecting the ring gear PH to a fixed housing component to produce a slow-driving stage L or, by connecting the ring gear PH to the main shaft $W_H$ or the sun gear PS, to produce a fast-driving stage S. The range group GP can be shifted with synchronization.

Power can be branched off from the countershaft $W_{VG2}$ of the group transmission CT to drive a power take-off PTO.

Such a group transmission is known for example from DE 10 2007 010 829 A1, wherein this prior art also shows a group transmission with a four-stage main transmission.

The main transmission HG of such a group transmission CT is made as an unsynchronized main transmission, while in contrast the downstream group that forms the range group GP and the upstream group that forms the splitter group GV are designed as synchronized transmission components. In this case, when carrying out a shifting operation, depending on the existing rotational speed difference, the transmission input or input shaft $W_{GE}$ of the group transmission CT has to be accelerated or braked to a required rotational speed, the braking taking place with the help of the transmission brake Br and the acceleration by controlled action upon the drive aggregate A with the separator clutch K engaged. For this synchronization process, the main transmission is then brought to a defined neutral position.

Now if, in a vehicle that is being driven and whose main transmission HG in the group transmission CT is in the neutral position, a gear is again to be engaged in the main transmission or the group transmission, then to do this it is as a rule necessary for the drive aggregate A to provide some assistance. In such a case, namely due to the speed of the moving vehicle, the output shaft $W_{GA}$ of the group transmission CT is being rotationally driven so that to produce a synchronized condition, the transmission input shaft $W_{GE}$ also has to be driven.

But if the drive aggregate A is malfunctioning, for example if it has stopped or can no longer be controlled, then the drive aggregate A can no longer provide any motor assistance for producing the synchronous condition, so that according to the prior art it is no longer possible to engage a gear.

Accordingly, a method for operating a drive-train with a group transmission is needed, with the help of which, when a vehicle is being driven and its main transmission HG is in the neutral position, a gear can be engaged in the group transmission CT even without motor assistance from the drive aggregate A.

SUMMARY OF THE INVENTION

Starting from there the present invention addresses the problem of providing a new type of method for operating a drive-train of a motor vehicle.

According to the invention, when a motor vehicle is being driven and the main transmission is in neutral, then if the drive aggregate malfunctions and in particular stops or cannot be controlled, in order to engage a gear, on the one hand, the downstream group is changed to a position where it transmits no power flow so that the downstream group can coast to a stop, while on the other hand, a shifting impulse is applied to a shifting cylinder of the main transmission so that shifting elements of the main transmission in the form of claws ratchet over one another until they mesh by virtue of a decreasing rotational speed difference and thereby engage the main transmission, and when the main transmission is thus engaged the downstream group is again brought to a position where it transmits the power flow.

With the method according to the invention it is made possible, when a vehicle with a group transmission is being driven and the unsynchronized main transmission of the group transmission is in neutral, to engage a gear in the unsynchronized main transmission HG and thus in the group transmission, starting from the neutral position of the main transmission, even when no motor assistance is available from the drive aggregate A.

According to an advantageous further development of the invention, after the main transmission has been engaged the downstream group is shifted to a fast-driving stage, namely in such manner that the downstream group is first actuated in the direction of a slow-driving stage and during this a transmission input speed is monitored, and when the transmission input speed has reached or exceeded a limit value, the actuation of the downstream group toward the slow-driving stage is interrupted and the downstream group is then actuated in the direction toward the fast-driving stage. This advantageous further development of the invention makes it possible, in particular at high driving speeds, to shift the downstream group safely into the fast-driving stage even when it uses a so-termed 2-quadrant synchronization system which only works in one rotational direction.

BRIEF DESCRIPTION OF THE DRAWINGS

Preferred further developments of the invention emerge from the description given below. An example embodiment of the invention, to which it is not limited, is explained in more detail with reference to the sole drawing, which shows a layout of a transmission of a motor vehicle known from the prior art, in the form of a group transmission together with a drive aggregate and an axle drive.

DETAILED DESCRIPTION OF THE PREFERRED EMBODIMENTS

The invention concerns a method for operating a drive-train of a motor vehicle, in particular a drive-train which besides a drive aggregate A, comprises the automated group transmission CT shown in the FIGURE and already described, with the unsynchronized main transmission HG, the synchronized upstream group in the form of a splitter group GV that is drivingly coupled upstream from the main transmission HG, and the synchronized downstream group in the form of a range group GP that is drivingly coupled downstream from the main transmission HG.

Although the invention is described in relation to this group transmission CT, its application is not intended to be limited to a group transmission of this type only, but rather, it can also be used with transmissions having no upstream group or ones with a downstream group designed as a splitter group.

Now, the present invention concerns such details of a method for operating a drive-train of a motor vehicle with a group transmission CT, by means of which, even when the motor vehicle is being driven with the main transmission HG in neutral and a malfunction is detected in the drive aggregate A such that the latter is not available for providing motor assistance for engaging a gear, a gear can still be engaged in the main transmission HG and therefore in the group transmission. This becomes possible in particular when the drive aggregate A has stopped or cannot be controlled.

When the motor vehicle is being driven with the main transmission HG in the neutral position and a malfunction develops in the drive aggregate A, in particular if it stops or cannot be controlled, the procedure for engaging a gear is that on the one hand the downstream group, in the form of the range group GP in the example embodiment illustrated in the FIGURE, is brought to a position where the downstream group transmits no power flow. Then, when the downstream group is thus disengaged from the power flow, the section of the group transmission CT between the main transmission HG and the downstream group GP in the form of the range group can run freely and therefore coast to a stop.

Furthermore, a shifting impulse is applied to a shifting cylinder of the unsynchronized main transmission HG such that shifting elements of the main transmission HG in the form of claws ratchet over one another until they mesh, due to the decreasing rotational speed difference.

When the shifting elements of the main transmission HG made as claws have meshed, the main transmission is engaged and capable of transmitting power or torque.

Then, when the main transmission is engaged, the downstream group in the form of the range group GP in the example embodiment illustrated is once more brought to a position where it transmits the power flow.

The above-mentioned application of the shifting impulse to the shifting cylinder of the main transmission HG can take place either at the same time as the shift of the downstream group GP to the position where it transmits no power flow, or immediately thereafter. In either case the shifting impulse is applied to the shifting cylinder of the main transmission HG at a time before the downstream group GP has coasted or run down to a stop, in order to avoid a tooth-on-tooth position in the main transmission HG.

As already explained, once the main transmission HG has been engaged, which takes place when its shifting elements in the form of claws have meshed, the downstream group GP is again brought to its power-flow-transmitting position and this preferably in such manner that the downstream group GP is in its fast-driving stage S.

Especially when the downstream group GP has a so-termed 2-quadrant synchronization system which only works in one rotation direction, to shift the downstream group GP into its fast-driving stage S while the main transmission HG is closed, the procedure adopted is that the downstream group GP is at first actuated in the direction toward the slow-driving stage L, and during this a transmission input rotational speed, namely the speed of the input shaft $W_{GE}$ of the transmission, is monitored.

Due to the actuation of the downstream group GP in the direction toward the slow-driving stage L, the 2-quadrant synchronization system acts and the transmission input speed increases.

With a 2-quadrant synchronizer which only works in one rotation direction, in a downshift from fast to slow the input side of the transmission accelerates, while in contrast, in an upshift from slow to fast the transmission input shaft in braked. Since in the method according to the invention, were the fast-driving stage S to be engaged from the non-transmitting position of the downstream group GP, the 2-quadrant synchronizer would not be effective, the downstream group is first actuated toward the slow-driving stage L as described above.

When the transmission input speed, namely the rotational speed of the input shaft $W_{GE}$ of the transmission, has reached or exceeded a limit value, the actuation of the downstream group GP in the direction toward the slow-driving stage L is interrupted and the downstream group GP is then actuated toward the fast-driving stage S. In this way any existing speed difference is reduced and the downstream group GP can immediately be brought or shifted to its power-flow-transmitting condition, namely to the fast-driving stage S.

The actuation of the downstream group GP toward the slow-driving stage L is interrupted when the transmission input, corrected by a possible transmission gear ratio, is rotating faster than the axle drive AB or the speed of the input shaft $W_{GE}$, corrected by the possible gear ratio, is higher than the speed of the axle drive AB. As soon as the actuation of the downstream group GP toward the slow-driving stage L has been interrupted, its actuation in the direction toward the fast-driving stage S begins.

The above actuation of the downstream group GP toward the slow-driving stage L and toward the fast-driving stage S takes place by means of shifting elements of the downstream group GP in the form of valves. To actuate the downstream group GP toward the slow-driving stage L, a valve for the direction of the slow-driving stage is activated. To actuate the downstream group toward the fast-driving stage S, a valve for the direction of the fast-driving stage S is activated.

After the main transmission HG has been engaged, the downstream group GP can also be shifted into the slow-driving stage L. However, since as a rule the function becomes active at high driving speeds, it is then necessary to shift the downstream group GP to the fast-driving stage S.

When carrying out the method according to the invention, the separator clutch K, which in the example embodiment shown in the FIGURE is connected between the drive aggregate A and the upstream group GV formed as a splitter group, is disengaged when, at the beginning, the downstream group GP of the group transmission CT is brought to the position where it does not transmit the power flow or when, alternatively, the main transmission HG is engaged by the meshing of its claws.

When, already at the beginning of the process, the separator clutch K is disengaged at the same time as the shifting of the downstream group GP to its non-power-flow transmitting position, the engagement of the main transmission HG takes place by the ratcheting and eventual meshing of the shifting elements of the main transmission HG while the separator clutch K is disengaged and the downstream group GP is not transmitting the power flow.

On the other hand, if the separator clutch K is not disengaged until the main transmission HG has already been engaged, the engagement of the main transmission HG by ratcheting and then meshing of the shifting elements of the main transmission HG takes place with the separator clutch K engaged and the downstream group GP not transmitting the power flow.

Disengaging the separator clutch K immediately when the shifting of the downstream group GP to its non-power-flow transmitting condition begins, has the advantage that in this case the engagement of the main transmission HG by the ratcheting and then meshing of its shifting elements takes place more quickly and more easily.

When the main transmission HG has been engaged by the ratcheting and subsequent meshing of its shifting elements, and when the downstream group GP is again changed to its power-flow-transmitting condition, the separator clutch K is engaged again so that the drive aggregate A is drag-started.

The method according to the invention can be used with group transmissions both having and not having an upstream group. In the case of group transmissions that have an upstream group, the above-described function of the separator clutch K, namely its disengagement and subsequent engagement, can also be performed by the upstream group GV connected between the separator clutch K and the main transmission HG, in that the group GV can first be changed to a non-power-flow transmitting position and then again to a power-flow transmitting position. However, the use of the separator clutch is preferred on the grounds of wear.

Indexes

Br Transmission brake
CT Group transmission
G1 Gear for forward driving
G2 Gear for forward driving
G3 Gear for forward driving
GV Splitter group
GP Range group
HG Main transmission
K Separator clutch
K1 Gear step
K2 Gear step
L Slow-driving stage
PS Sun gear
PT Planetary carrier
PTO Power take-off
PH Ring gear
R Gear for reverse driving
S Fast-driving stage
S1 Shifting packet
S2 Shifting packet
SP Shifting packet
SV Shifting packet
$W_{GA}$ Output shaft
$W_{GE}$ Input shaft
$W_H$ Main shaft
$W_{VG1}$ Countershaft
$W_{VG2}$ Countershaft A Drive aggregate
AB Axle drive

The invention claimed is:

1. A method of operating a drive-train of a motor vehicle in which the drive-train comprises an automated shift transmission, between a drive aggregate and an axle drive, with at least one unsynchronized main transmission and a synchronized downstream group, drivingly coupled downstream from the main transmission, and an input shaft of the automated shift transmission being connected with the drive aggregate by way of a controllable separator clutch and an output shaft of the automated shift transmission being connected to the axle drive, the method comprising the steps of:

when the motor vehicle is being driven and the main transmission adopts a neutral position and if a malfunction develops in the drive aggregate such that the aggregate stops or cannot be controlled, then operating the drive-train to engage a gear, on the one hand, by bringing the downstream group to a non-power-flow transmitting position such that the downstream group coasts to a stop, and, on the other hand, applying a shifting impulse to a shifting cylinder of the main transmission such that shifting elements of the main transmission ratchet over one another until the shifting elements mesh due to the decreasing rotational speed difference and thereby engaging the main transmission, and bringing the downstream group to a power-flow-transmitting position once the main transmission is engaged.

2. The method according to claim 1, further comprising the step of disengaging the separator clutch as soon as the downstream group of the automated shift transmission shifts to the non-power-flow transmitting position such that the engagement of the main transmission, by virtue of the ratcheting and the subsequent meshing of the shifting elements of the main transmission, occurs with the separator clutch disengaged and without the downstream group transmitting power flow.

3. The method according to claim 1, further comprising the step of disengaging the separator clutch when the main clutch is engaged such that the engagement of the main clutch, by the ratcheting and the meshing of the shifting elements of the main transmission, occurs with the separator clutch engaged and without the downstream group transmitting power flow.

4. The method according to claim 2, further comprising the step of re-engaging the separator clutch, once the main transmission is engaged, when the downstream group is brought to the power-flow-transmitting position so as to drive start the drive aggregate.

5. The method according to claim 1, further comprising the step of, once the main transmission is engaged, bringing the downstream group to the power-flow-transmitting position such that the downstream group is shifted into a fast-driving stage.

6. The method according to claim 5, further comprising the step of shifting the downstream group into the fast-driving stage by first actuating the downstream group in a direction toward a slow-driving stage, during which a transmission input rotational speed is monitored, and once the transmission input rotational speed either reaches or exceeds a limit value, interrupting the actuation of the downstream group, in the direction toward the slow-driving stage, and then actuating the downstream group in a direction toward the fast-driving stage.

7. The method according to claim 6, further comprising the step of actuating the downstream group in the direction toward the slow-driving stage by first actuating a shifting element by which the downstream group is shifted to the slow-driving stage, and when the transmission input rotational speed, corrected by a possible transmission gear ratio, is higher than a rotational speed of the axle drive, deactivating the shifting element for the slow-driving stage and immediately activating another shifting element by which the downstream group is shifted to the fast-driving stage.

8. The method according to claim 1, further comprising the step of when the main transmission is engaged, shifting the downstream group to its power-flow-transmitting position in such a manner that the downstream group is brought to a slow-driving stage.

9. The method according to claim 1, wherein the automated shift transmission comprises, in addition to the unsynchronized main transmission and the synchronized downstream group, a synchronized upstream group that is drivingly coupled upstream of the main transmission, the synchronized upstream group is a splitter group, and the method further comprising the step of either disengaging and subsequently engaging the separator clutch or bringing the upstream group to a position where the upstream group does not transmit power flow and subsequently bringing the upstream group again to a power-flow-transmitting position.

10. The method according to claim 1, further comprising the step of applying the shifting impulse to the shifting cylinder of the main transmission either at the same time as the shift of the downstream group to in its non-power-flow transmitting position or immediately thereafter.

11. A method of operating a drive-train of a motor vehicle such that the drive-train comprises a drive aggregate, an axle drive and an automated shift transmission located therebetween, the automated shift transmission comprising at least one unsynchronized main transmission and a synchronized downstream group that is drivingly coupled downstream from the main transmission, an input shaft of the automated shift transmission being connected, via of a controllable separator clutch, to the drive aggregate and an output shaft of the automated shift transmission being connected to the axle drive, the method comprising the steps of:

implementing the method to engage a gear in an event that the drive aggregate malfunctions when the motor vehicle is being driven and the main transmission is in a neutral position;

bringing the downstream group to a position such that the downstream group does not transmit any power flow thereby enabling the downstream group to coast to a stop;

applying at least one shifting impulse to a shifting cylinder of the main transmission such that shifting elements of the main transmission ratchet over one another until the shifting elements mesh with one another due to a decreasing rotational speed difference thereby engaging the main transmission; and bringing the downstream group to a power-flow-transmitting position once the main transmission is engaged.

12. A method of operating a drive-train of a motor vehicle such that the drive-train comprises a drive aggregate, an axle drive and an automated shift transmission located therebetween, the automated shift transmission comprising an unsynchronized main transmission, a synchronized downstream group and a synchronized upstream group that is drivingly coupled upstream of the main transmission, an input shaft of the automated shift transmission being connected, via of a controllable separator clutch, to the drive aggregate and an output shaft of the automated shift transmission being connected to the axle drive, the method comprising the steps of:

implementing the method to engage a gear in an event that the drive aggregate malfunctions when the motor vehicle is being driven and the main transmission is in a neutral position;

bringing the downstream group to a position such that the downstream group does not transmit any power flow thereby enabling the downstream group to coast to a stop;

applying at least one shifting impulse to a shifting cylinder of the main transmission such that shifting elements of the main transmission ratchet over one another until the shifting elements mesh with one another due to a decreasing rotational speed difference thereby engaging the main transmission; and bringing the downstream group to a power-flow-transmitting position once the main transmission is engaged.

13. The method according to claim 12, further comprising the step of disengaging the separator clutch as soon as the downstream group of the automated shift transmission shifts to the non-power-flow transmitting position such that the engagement of the main transmission, by virtue of the ratcheting and the subsequent meshing of the shifting elements of the main transmission, occurs with the separator clutch disengaged and without the downstream group transmitting power flow.

14. The method according to claim 13, further comprising the step of disengaging the separator clutch when the main clutch is engaged such that the engagement of the main clutch, by the ratcheting and the meshing of the shifting elements of the main transmission, occurs with the separator clutch engaged and without the downstream group transmitting power flow.

15. The method according to claim 12, further comprising the step of re-engaging the separator clutch, once the main transmission is engaged, when the downstream group is brought to the power-flow-transmitting position so as to drive start the drive aggregate.

* * * * *